UNITED STATES PATENT OFFICE.

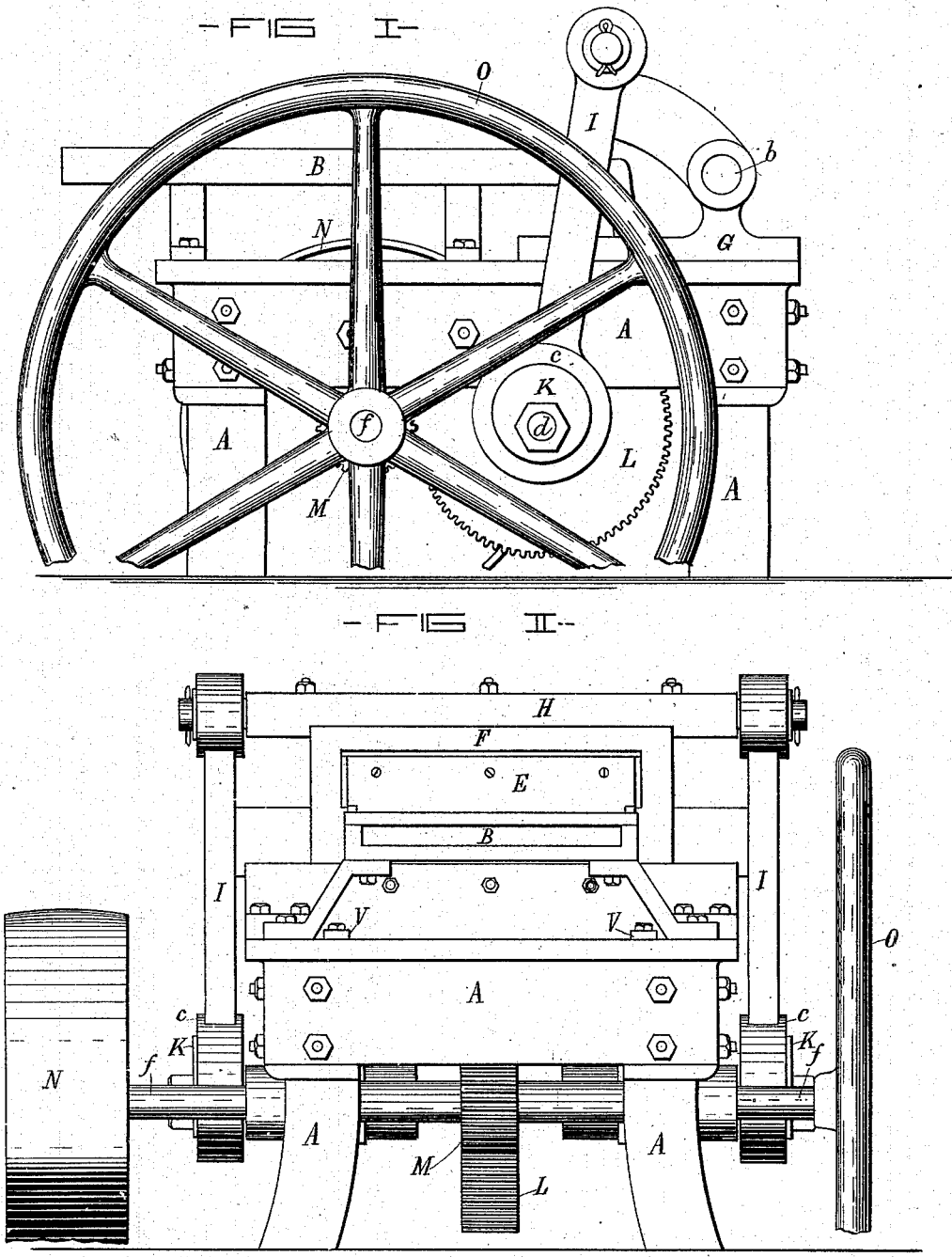

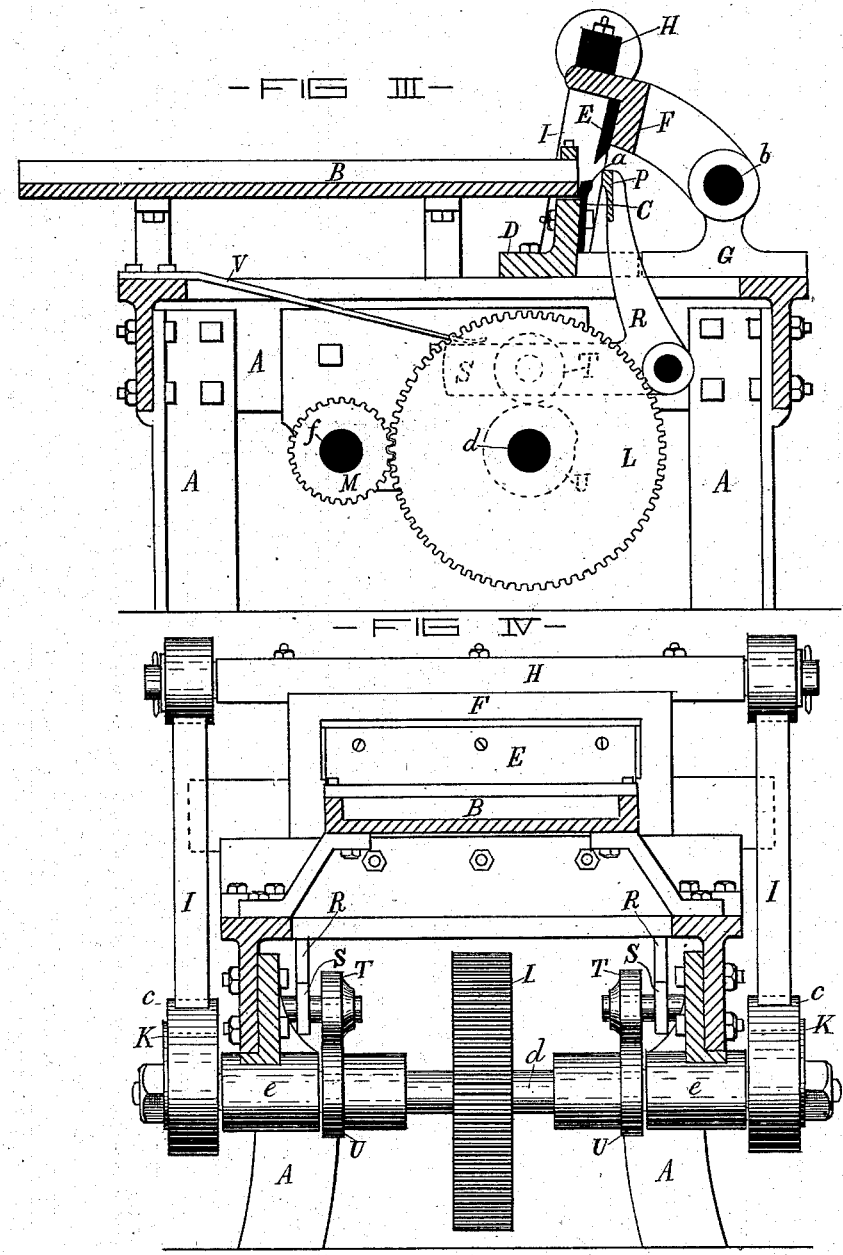

GEORGE T. PILLINGS, OF BALTIMORE, MARYLAND.

MACHINE FOR CUTTING SOLDER.

SPECIFICATION forming part of Letters Patent No. 288,482, dated November 13, 1883.

Application filed February 2, 1883. (No model.)

*To all whom it may concern:*

Be it known that I, GEORGE T. PILLINGS, of the city of Baltimore and State of Maryland, have invented a Machine for Making Drop-Solder, of which the following is a specification.

This invention relates to certain improvements in a machine for cutting bars of solder into short pieces, or what are generally termed by manufacturers of sheet-metal cans "drops;" and it consists in certain details of construction of the said machine, as will hereinafter fully appear.

In the description of the invention which follows, reference is made to the accompanying drawings, forming a part hereof, and in which—

Figures I and II are exterior side views of the machine with certain parts thereof removed, as seen from different points. Figs. III and IV are respectively a longitudinal and a transverse section of the machine.

Similar letters of reference indicate similar parts in all the views.

A is the frame of the machine, which, to allow of the revolution of the driving-pulley and fly-wheel, hereinafter alluded to, is elevated on a table or block. (Not shown in the drawings.)

B is a tray in which the solder-bars are placed, and from which they are fed to the cutting mechanism. It must be understood that in the manufacture of drop-solder the metal is cast in triangular bars separated by strips, and for the sake of economy a series of these connected bars are fed to the cutter. Consequently at each stroke of the cutter as many pieces are detached as there are bars.

The cutting mechanism consists of a stationary knife, C, secured to a bracket, D, with its cutting-edge *a* about on a line with the surface of the tray B, (see Fig. III,) and a second knife, E, fastened to a cutting-head, F, pivoted to stands G at *b*. (See Figs. I and III.) A bar, H, is bolted to the upper side of the cutting-head F, and at its ends adapted for connection to the rods I. The lower end of the bars I are bored out to form straps *c* for the eccentrics K, which are secured on the shaft *d*, supported in bearings *e*.

L is a gear-wheel fastened to the shaft *d*, and driven from the main driving-shaft *f* by a pinion, M. The driving-shaft has an ordinary pulley, N, and fly-wheel O. (Shown in Figs. I and III.) At each revolution of the shaft *d* and its eccentrics K the cutting-head F is forced down and the edge of the knife E caused to pass the cutting-edge *a* of the knife C. At each elevation of the knife E the solder-bars are pushed by hand over the cutting-edge *a* until they come in contact with the gage-plate P, supported by pivoted arms R, which serve to regulate the length of the drops. The arms R have branch arms S, carrying rollers T, which latter devices rest on cams U on the shaft *d*. These cams are of such shape that at each downward stroke of the knife E the plate P is carried away from its original position and the drops of solder allowed to fall to a chute, which is not shown in the drawings. A spring, V, causes the gage to assume its original position.

I claim as my invention—

In a machine for making drop-solder, the frame A, carrying the tray B and fixed knife C, rotative shaft *d*, having thereon the eccentrics K, cutting-head F, having the knife E, eccentric-rods and strap I I and *c*, combined with the arms R, and means to move out the said arms after the descent of the knife E in the cutting operation, substantially as and for the purpose specified.

GEORGE T. PILLINGS.

Witnesses:
EDW. J. DIGGS,
JOHN WILLIAMS.